(12) United States Patent
Takenaga

(10) Patent No.: US 6,563,459 B2
(45) Date of Patent: May 13, 2003

(54) PORTABLE TERMINAL APPARATUS AND THE POSITIONAL INFORMATION COMMUNICATION METHOD USING IT

(75) Inventor: Takashi Takenaga, Tokyo-to (JP)

(73) Assignees: Pioneer Corporation, Tokyo-to (JP); Increment P Corporation, Tokyo-to (JP)

( * ) Notice: Subject to any disclaimer, the term of this patent is extended or adjusted under 35 U.S.C. 154(b) by 0 days.

(21) Appl. No.: 09/875,459

(22) Filed: Jun. 5, 2001

(65) Prior Publication Data

US 2001/0050631 A1 Dec. 13, 2001

(30) Foreign Application Priority Data

Jun. 6, 2000 (JP) ........................................ 2000-168605

(51) Int. Cl.⁷ .............................................. H04B 7/185
(52) U.S. Cl. ................................................... 342/357.1
(58) Field of Search .................... 342/357.09, 357.08, 342/357.1, 357.13, 29, 30, 31, 32; 701/301

(56) References Cited

U.S. PATENT DOCUMENTS

| | | | | |
|---|---|---|---|---|
| 5,313,201 A | * | 5/1994 | Ryan | 342/29 |
| 5,872,526 A | * | 2/1999 | Tognazzini | 342/29 |
| 5,952,959 A | | 9/1999 | Norris | 342/357 |
| 6,373,430 B1 | * | 4/2002 | Beason et al. | 342/357.09 |
| 6,377,210 B1 | * | 4/2002 | Moore | 342/357.09 |

FOREIGN PATENT DOCUMENTS

| | | |
|---|---|---|
| DE | 195 14 133 | 1/1997 |
| DE | 198 48 192 | 4/2000 |
| EP | 0 379 198 | 7/1990 |
| JP | 10304429 A | 11/1998 |
| JP | 10341476 A | 12/1998 |

* cited by examiner

Primary Examiner—Thomas H. Tarcza
Assistant Examiner—Fred H. Mull
(74) Attorney, Agent, or Firm—Ladas & Parry

(57) ABSTRACT

A portable terminal apparatus which can communicate one's current location on a map and an associated message to the party on the other end of a cellular phone line. In the apparatus, a positional information acquiring device acquires positional information. Then, a transmitting device transmits the acquired positional information along with an associated message to other portable terminal apparatuses. Further, a receiving device receives the positional information and message transmitted from other portable terminal apparatuses. Then, a map data acquiring device acquires the map data in a predetermined range including the location shown by the received positional information. A displaying device displays the map data together with a mark that indicates the position shown by the received positional information.

10 Claims, 7 Drawing Sheets

PORTABLE TERMINAL APPARATUS AND THE POSITIONAL INFORMATION COMMUNICATION METHOD USING IT

BACKGROUND OF THE INVENTION

1. Field of the Invention

The invention relates to terminal apparatuses such as cellular phones equipped with the GPS (Global Positioning System.) and positional information communication method using it.

2. Description of the Related Art

Along with miniaturization of GPS, cellular phones with the GPS have been being developed in recent years. Japanese Laid-Open Patent Application No. Heisi 10-341476 and Japanese Laid-Open Patent Application No. Heisi 10-304429 describe examples of cellular phones where GPS allows the cellular phone users to determine and display the current location superimposed on the map data in the display unit of a cellular phone.

Cellular phones are used relatively frequently, e.g., when a meeting is arranged and the place for the meeting needs to be confirmed. When you cannot find the person you are supposed to meet with at the place of meeting, you often use the cellular phone to call and ask the person you wait where he currently is. In such case, it would be convenient to have the person know the current location of yours together with a map data.

However, map data generally is large in terms of the data volume depending on the reduction scale and the nature of the map; thus it takes time for transmission and is not suitable for transmission/reception by cellular phones.

SUMMARY OF THE INVENTION

The present invention is made in view of the case described above, and it is therefore an object of the present invention to provide a portable terminal apparatus which enables to communicate one's current location on a map to the party on the other end of the cellular phone line with a little amount of data transmitted. Moreover, another purpose of the invention is to provide a portable terminal apparatus with which a certain location on a map not limited only to the current location can be communicated to the other party.

The above object of the present invention can be achieved by a portable terminal apparatus of the present invention. The portable terminal apparatus is provided with: a positional information acquiring device for acquiring positional information; a transmitting device for transmitting the acquired positional information to other portable terminal apparatuses; a receiving device for receiving the positional information transmitted from other portable terminal apparatuses; a map data acquiring device for acquiring the map data in a predetermined range including the location shown by the received positional information; and a displaying device for displaying the map data together with a mark that indicates the position shown by the received positional information.

According to the present invention, the positional information acquired by a portable terminal apparatus can be sent to another portable terminal apparatus. The portable terminal apparatus on the reception side which receives the positional information displays the map data in a predetermined range based on the received positional information with a mark to indicate the location. Therefore, a specific location such as the location of the portable terminal apparatus can be displayed in other portable terminal apparatuses together with the map data. Also, the time and cost required for communication would be minimal as the information transmitted is the positional information only.

In one aspect of the present invention, the positional information acquiring device includes a GPS apparatus which obtains positional information of the portable terminal apparatus based on a wave from a satellite.

According to this aspect, the current location of a portable terminal apparatus can be transmitted to other portable terminal apparatuses.

In another aspect of the present invention, the positional information acquiring device includes a positional information input unit used by a user to enter the positional information.

According to this aspect, the positional information a user entered can be transmitted to other portable terminal apparatuses and be displayed with the map data.

In another aspect of the present invention, the portable terminal apparatus is provided as a cellular phone set. In addition, the transmitting device is provide with a transmission instruction input unit for a user to enter transmission instructions during a call and a transmission unit to transmit the positional information when the transmission instruction is entered.

According to this aspect, a user can transmit the positional information during a regular phone call.

In another aspect of the present invention, the portable terminal apparatus is provided as a cellular phone set. In addition, the transmitting device is provided with an attaching device to attach the positional information to a message to be transmitted to other cellular phones and a transmission unit to transmit the positional information together with the message.

According to this aspect, the positional information can be sent utilizing the email function of cellular phones.

In another aspect of the present invention, the map data acquiring device is provided with a map data storing device that stores acquired map data and a map data acquiring device for acquiring map data in a predetermined range from the map data storing device based on the positional information.

According to this aspect, a positional mark can be displayed on the map data previously stored in the map data storing device.

In another aspect of the present invention, the map data storing device is a memory removable to the portable terminal apparatus.

According to this aspect, users can mount and make use of the memory that stores map data of the appropriate areas.

In another aspect of the present invention, the map data acquiring device comprises a transmitting device for transmitting the positional information to the site that provides map data via the internet and an acquiring device for acquiring map data in a predetermined range from the site that provides the map information.

According to this aspect, the positional information can be displayed on the map data even when the map data is not stored in the portable terminal apparatus.

The above object of the present invention can be achieved by a information communication method for communicating positional information between a portable terminal apparatus equipped with a GPS apparatus on a transmission side and another portable terminal apparatus on a reception side in accordance with the present invention. The method is provided with the processes of: acquiring positional information that shows the current location of the portable terminal apparatus using the GPS apparatus; transmitting the positional information to the terminal apparatus on the reception side from the terminal apparatus on the transmission side; receiving the positional information in the terminal apparatus on the reception side; acquiring map data in a predetermined range including the location shown by the positional information; and displaying the map data acquired together with a mark that indicates the location shown by the positional information.

According to the present invention, the current location of the portable terminal apparatus on the transmission side acquired by using the GPS is sent to the portable terminal apparatus on the reception side and is displayed with positional mark superimposed on the map data.

DETAILED DESCRIPTION OF THE PREFERRED EMBODIMENT

Next, a preferred embodiment of the invention will be described in reference with the following diagrams.

[1] Configuration of Cellular Phone Set

Figure 1:
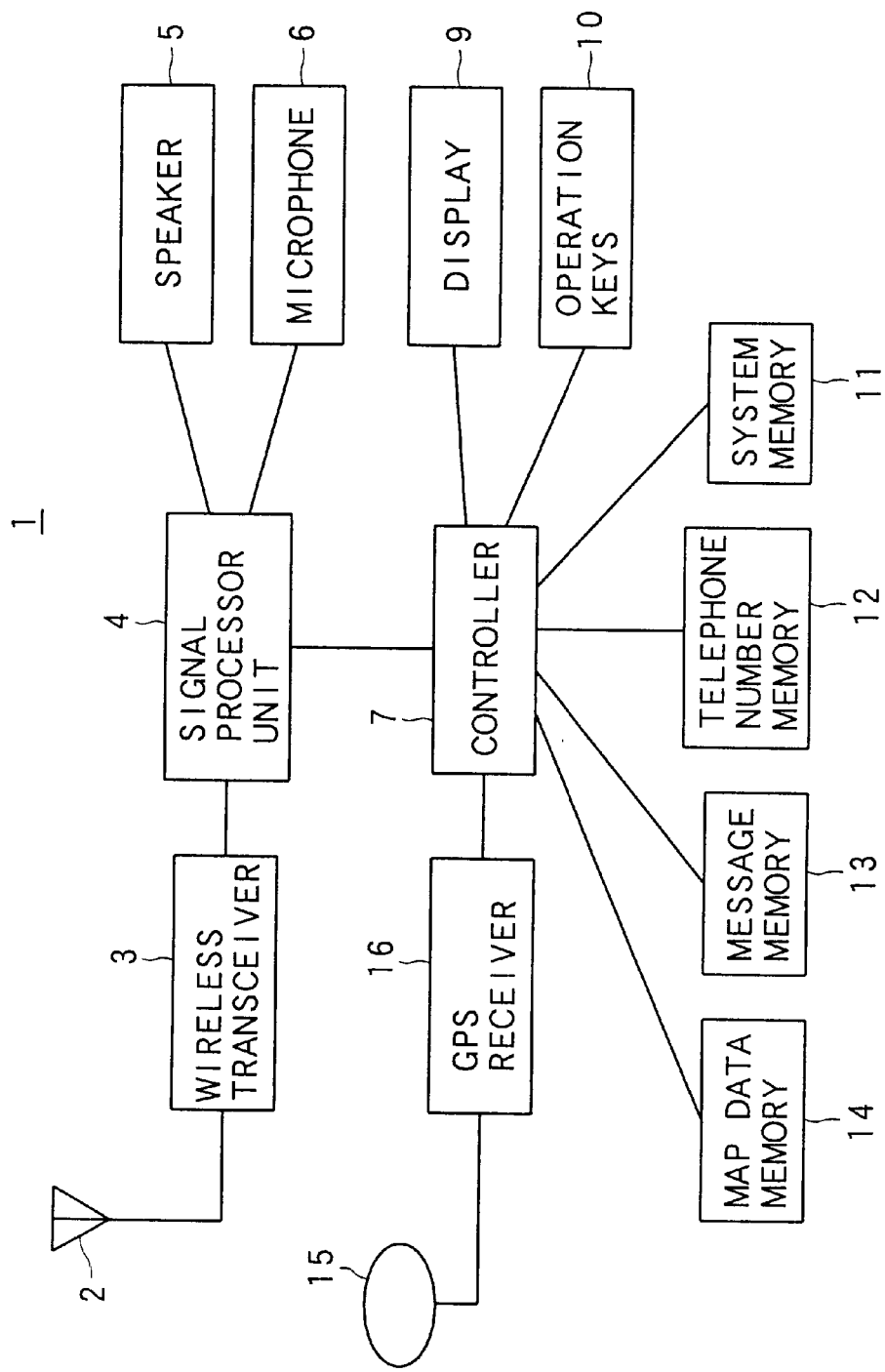
FIG. 1 is a block diagram that shows the configuration of the cellular phone set in relation to a preferred embodiment of the invention.

FIG. 1 shows the outline configuration of the cellular phone set in relation to the preferred embodiment of the invention. The cellular phone set 1 is controlled and operated by control unit 7 comprising the CPU and others.

The voice signal of a call is processed in an antenna 2, a wireless transceiver 3 and a signal processor 4. The waves transmitted from other cellular phone sets are received with the antenna 2 and demodulated in the wireless transceiver 3 so that received signal is generated. The received signal is processed in the signal processor 4 for reproduction to be reproduced as voice from speaker 5. In the mean time, the conversation of the speakers is entered in a microphone 6 to be converted to voice signals. The voice signals are processed in the signal processor 4 for transmission and sent to the wireless transceiver 3. The voice signals from the signal processor 4 is demodulated in the wireless transceiver 3 to be sent to the antenna 2, and the antenna 2 transmits the voice signals in the form of waves.

Figure 6A:
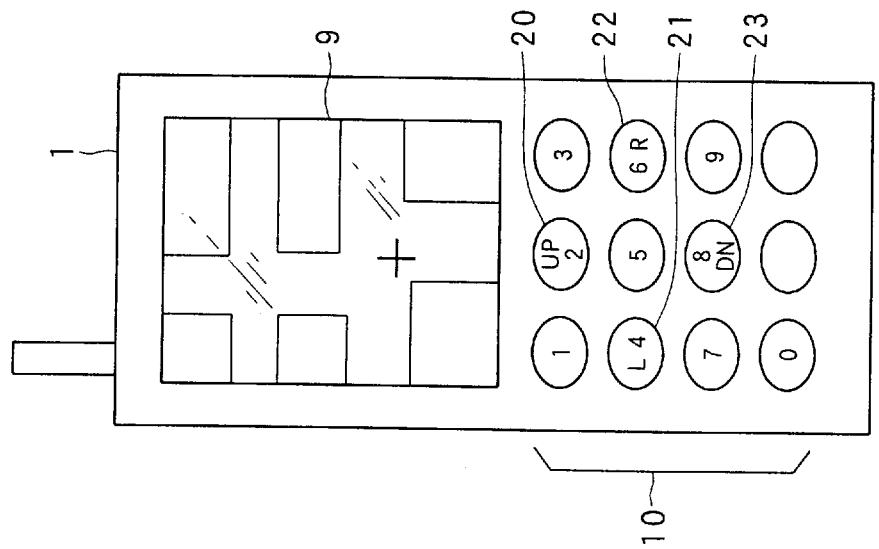
FIGS. 6A–6B are diagrams that show an example of an external view of the cellular phone set shown in FIG 1.

A cellular phone set 1 is usually equipped with a display unit 9 installed on the front panel of the cellular phone set 1, etc., and an operation keys 10. FIG. 6A shows an example of an external view of the cellular phone set 1. The display unit 9 is a liquid crystal display unit in general, and the operation key 10 includes numeric keyboard and other function keys. Also, a part of numeric keys are assigned as scroll keys 20 through 23 to scroll the information displayed on the display screen up, down, and to the right, and left.

A GPS antenna 15 receives waves from multiple satellites and supplies the received signal to a GPS receiver 16. The GPS receiver 16 makes use of the multiple waves to obtain the current location for the cellular phone set 1 and provides the current location data to control unit 7. The current location data, for instance, can be latitude and longitude data.

The control unit is connected to a system memory 11, a telephone number memory 12, a message memory 13 and a map data memory 14. The system memory 11 previously stores the programs to carry out various functions the cellular phone set 1 has. Also, the system memory 11 includes a work memory which is used to temporarily store data in the course of various processing. The telephone number memory 12 stores multiple telephone numbers in relation to the parties' names. The message memory 13 stores messages transmitted and received by the email function of cellular phones and the like. The map data memory 14 stores the map data to display the current location described later.

The map data memory 14 can be of a replaceable type such as a card or a chip. Such replaceable memory with map information for an area previously stored can be made for sale. In such case, a user of the cellular phone set 1 would purchase the map memory that corresponds to the area he frequents and set it in the cellular phone set 1. Alternatively, the user can purchase the replaceable memory with nothing stored in it, then store the map data in the area required from the map data sold on the market, e.g., in the form of CD-ROM using a personal computer or download the map information of the required area to the memory by connecting to the sites that provides the map information via the internet.

[2] Current Location Transmission

Then, the transmission of the current location information by the cellular phone set 1 of the invention will be described in reference with the flow charts in FIGS. 2 and 3. Suppose a transmitter A is sending the current location information to a receiver B. Provided that the both parties are in possession of the cellular phone set 1 shown in FIG. 1. Also, the following processing is performed by executing the program previously stored in the system memory 11 shown in FIG. 1 and controlling other components in the controller 7.

[1] Current Location Transmission During a Call

Figure 2B:
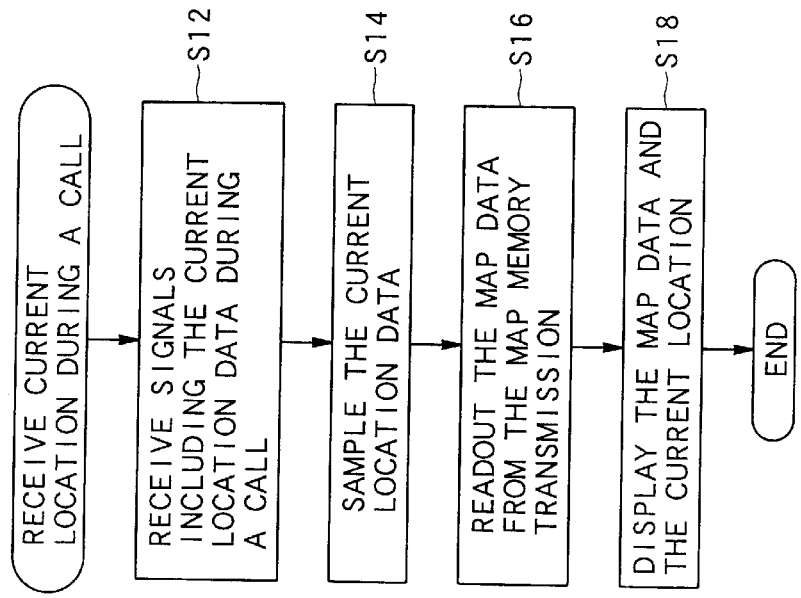
FIGS. 2A–2B are flowcharts that show the current location data transmission processing during a call.
Figure 2A:
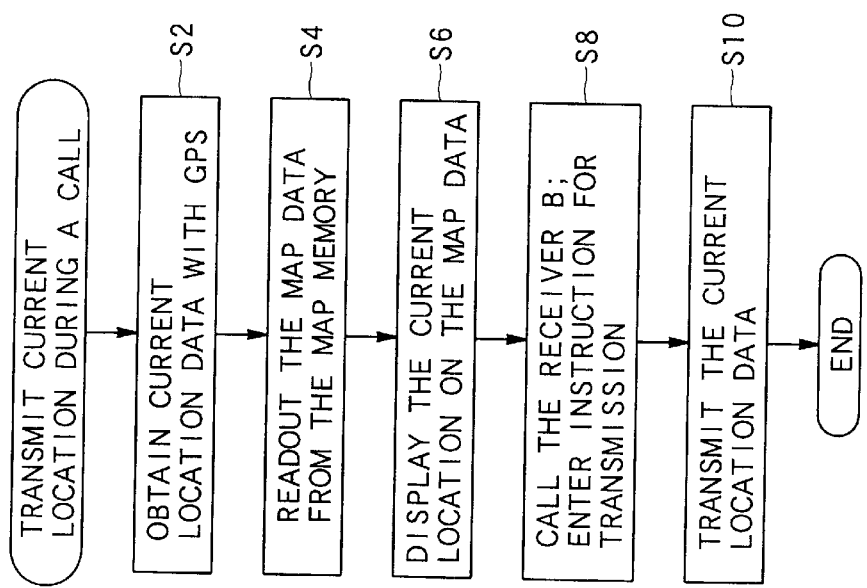

First of all, FIG. 2 shows the processing when the current location is transmitted during a normal call. FIG. 2A shows the processing done on the transmitter A side, and FIG. 2B shows the processing done on the receiver B side.

Figure 6B:
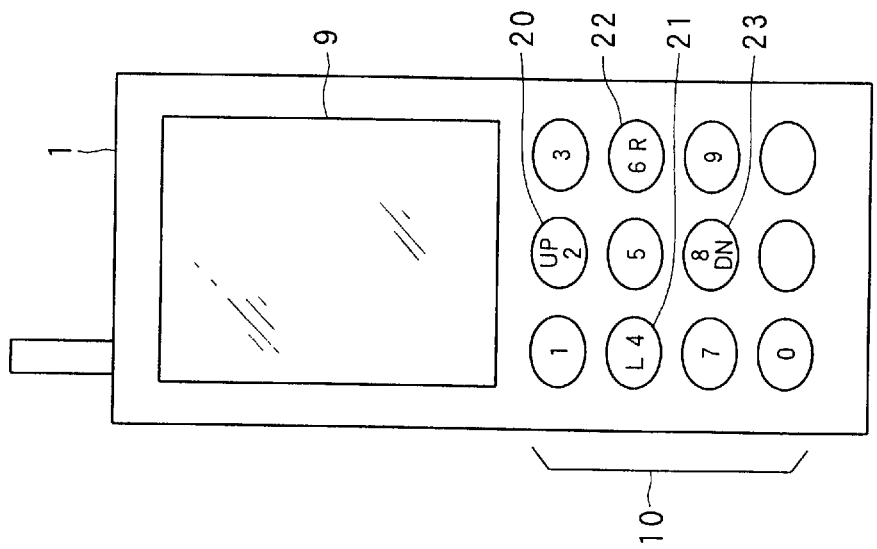

First, the transmitter A operates his cellular phone set 1 and enters an instruction to obtain the current location. In response to this, the controller 7 controls the GPS receiver 16 to obtain the current location data, and the system memory 11 temporarily stores the data in the work memory (step S2). Then, the controller 7 accesses to the map memory 14 and reads the obtained map data of the designated area including the current location and stores the data in the work memory (step S4). The controller 7 reads the map data from the work memory and displays the data on the display 9 with a mark, e.g., "+" mark that points the location that corresponds to the current location displayed in the display 9. By looking at the current location displayed in the display 9, the transmitter A can confirm his own current location before transmitting the information. FIG. 6B shows an example of the display in such case.

Then, the transmitter A calls the receiver B to inform the receiver B that he is going to send his current location data and operates appropriate operation keys 10 to enter the instruction to transmit the current location data (step S8). As a result, the current location data is transmitted to the receiver B's cellular phone (step S10). When the transmission is completed, the cellular phone set 1 disconnects the line, and the transmission processing is terminated. An important thing here is that the cellular phone set 1 of the transmitter A transmits the current location data only, but not the map data. The current location data is small in terms of the data volume of latitude and longitude data and the like as described earlier, therefore, communication does not take time. Also, because of this, the possibility of being affected by the radio interference during a call is low.

Now, in the step 8, the receiver B started communicating with the transmitter A, and the cellular phone set 1 of the receiver B receives the signals including the current location data (step S12). Then the controller 7 extracts the current location data from the received signals and temporarily stores the data in the work memory (step S14). Then, the map information memory is accessed to obtain the map data in a predetermined range including the current location to be stored in the work memory (step S16). The range of map data to be obtained here can be the range that can possibly be displayed in the display 9 at a time, or can be the range wider than that.

Lastly, the controller 7 displays the map data stored in the work memory on the display 9 with the current location mark (step S18). The above-mentioned processing displays the current location of the transmitter A together with the surrounding area in the display 9 of the receiver's cellular phone set 1.

Furthermore, FIG. 6B shows an example of the display in this case. The map data is a map data in the map data memory 14 of the receiver B's cellular phone set 1. Therefore, when the map data in the map data memory 14 of the transmitter A's cellular phone is the same as that in the map data memory 14 in the receiver B's cellular phone, the current location displayed in the display for both parties becomes the same. Even if the map data for the two parties are different, the current location of the transmitter A can be displayed on the map data owned by the receiver B with no inconvenience. Also, when the map data which is wider in range than what can be displayed in the display 9 is obtained in the step S16, the receiver B can scroll the map by operating the scroll keys 20 through 23 in the operation keys 10.

(2) Current Location Transmission by Email Function

Figure 3B:
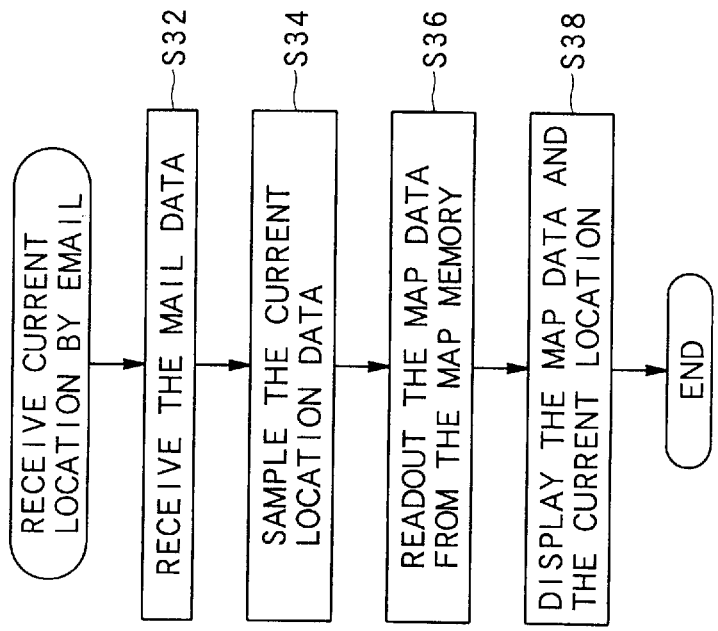
FIGS. 3A–3B are flowcharts that show the current location data transmission processing by using electronic mail function.
Figure 3A:
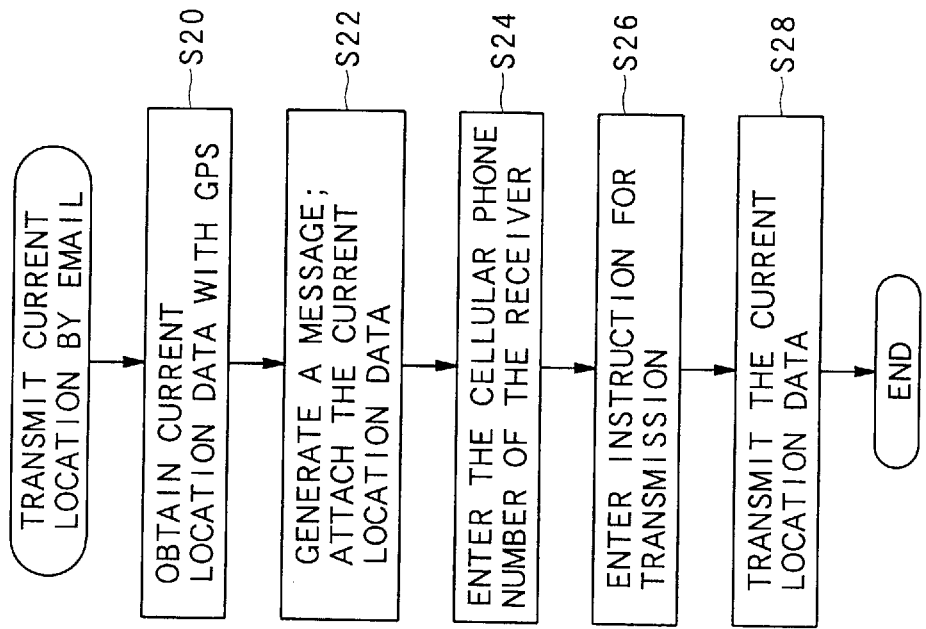

Now, the processing of current location transmission using email function in the cellular phone set 1 will be described in reference with FIG. 3. FIG. 3A shows the processing on the transmitter A side, and the FIG. 3B shows the processing on the receiver B side.

First of all, the transmitter A operates his cellular phone set 1 to obtain the current location data (step S20). Then a message is generated and the current location data is attached by operating the appropriate operation keys 10 (step S22). Then, the cellular phone number for the receiver (step S24) and the instruction for transmission (step S26) are entered in order to transmit the message and the current location data as an email (step S28).

The receiver B's cellular phone set 1 receives the data in the email (step S32). Then, the controller 7 extracts the current location data attached to the message (step S34) and then accesses to the map memory 14 to obtain the map data of the designated area including the current location designated by the current location data and stores the data temporarily in the work memory (step S36). The above-mentioned processing will transmit the current location data making use of the email function of the cellular phone set 1.

Furthermore, the transmission procedure by email described above is just an example, so that, the invention enables the current location to be transmitted making use of email functions with other various procedures.

(3) Map Data Acquisition by Internet

Figure 4:
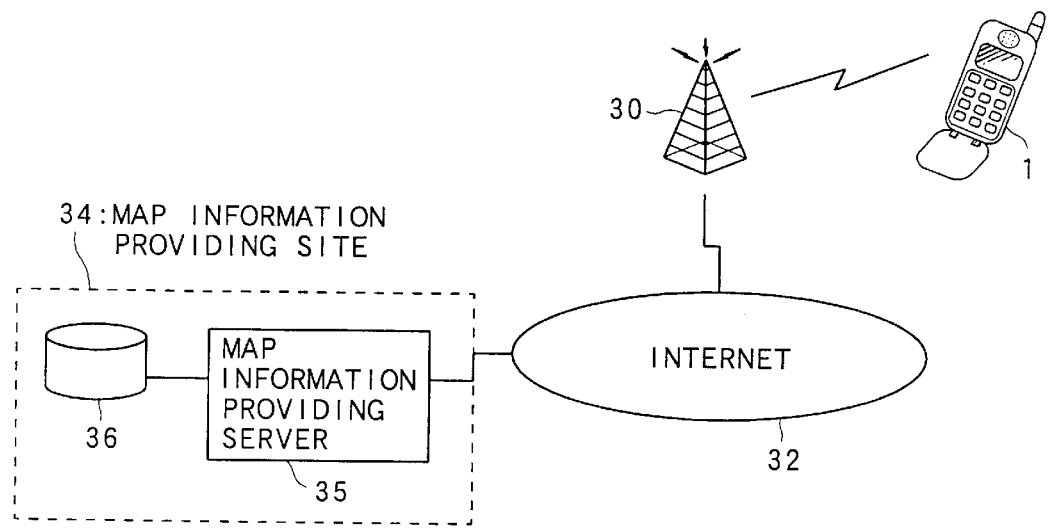
FIG. 4 is a diagram that shows the configuration when the map data is obtained through internet.

Now, the method of acquiring the map data through internet will be explained. FIG. 4 shows an outline configuration of the system when internet is used. In FIG. 4, a base station 30 for communication with the cellular phone set 1 and a map information providing site 34 are connected to the internet 32. The base station 30 works as a connection between the cellular phone set 1 and the internet 32. The map information providing site 34 comprises a map information providing server 35 and a map data base 36. The map data base 36 stores map data for various areas. A user can utilize the cellular phone set 1 to access to the map information providing site 34 and specify the required map data to download the map data to the map information memory 14 or the work memory of the cellular phone set 1.

Figure 5B:
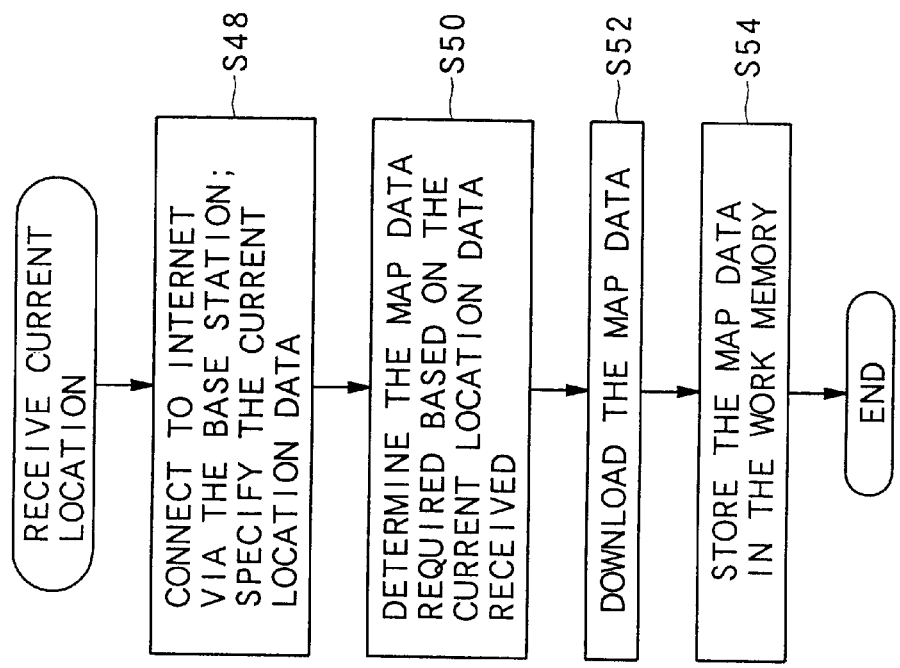
FIGS. 5A–5B are flowcharts that show the processing to obtain the map data through internet.
Figure 5A:
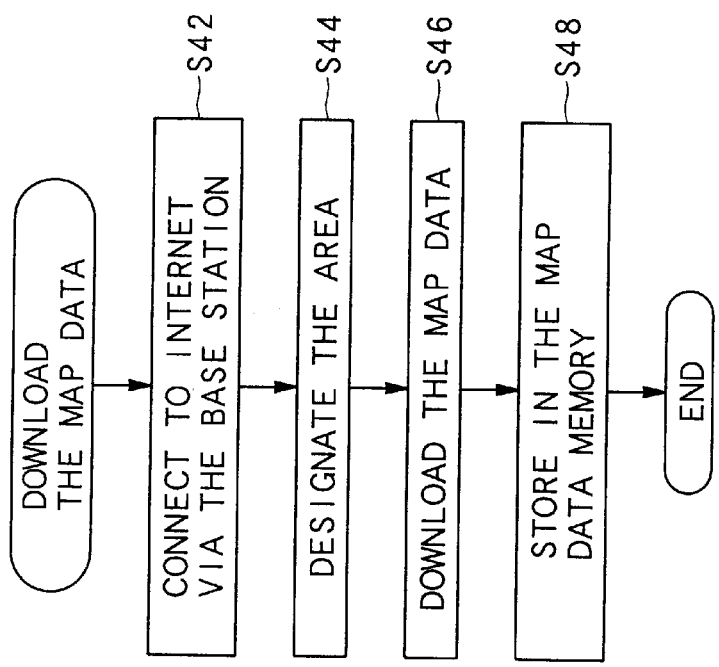

Then, the processing when a user downloads the map data from the map information providing site 34 to the map memory of his cellular phone set 1 will be explained in reference with FIG. 5A. The user operates his cellular phone set 1 to be connected to the internet 32 through the base station 30 (step S42). Then, the map data required is specified by specifying the name of the area and so on (step S44). Then, the map information providing server 35 accesses to the map data base 36 to obtain the map data of the designated area to transmit the map data to the cellular phone set 1 through the internet 32 and the base station 30 (step S46). The controller 7 of the cellular phone set 1 receives the map data to be stored in the map data memory 14 (step S48). With the above, the map data for the required area is stored in the user's map data memory 14.

Then, the case where the cellular phone set 1 does not have the map data memory 14 will be explained in reference with the FIG. 5B. In this case, the cellular phone set 1 is to access to the map information providing site 34 to obtain the map data. In other words, in steps S16 of FIG. 2B and S36 of FIG. 3B, the processing shown in FIG. 5B is carried out instead of accessing to the data memory. In short, the receiver's cellular phone set 1 is connected to the base station 30 through internet 32, and the current location data received is transmitted to the map information providing server 35 (step S48.) The map information providing server 35 accesses to the map data base 36 to obtain the map data in a predetermined range including the received current location data (step S50) to be sent to the cellular phone set 1 (step S52). The cellular phone set 1 temporarily stores the received map data in the work memory (step S54). In this manner, the map data for the current location and the surrounding area can be obtained from the map information providing site 34. Then, the map data and the current location mark is displayed in the display 9 of the cellular phone set 1 as shown in the steps S18 of FIG. 2B and S38 of FIG. 3B.

[3] Transmission of Location Data Other than the Current Location

Now, the transmission of location data other than the current location will be explained. The explanation made so far is for the case where the transmitter A is sending the current location data to the receiver B. However, the invention can also be applied when a transmitter A is sending other designated location data besides the current location to the receiver B. For instance, the transmitter A can transmit the location data, e.g., his home or prominent buildings to the receiver B.

Figure 7:
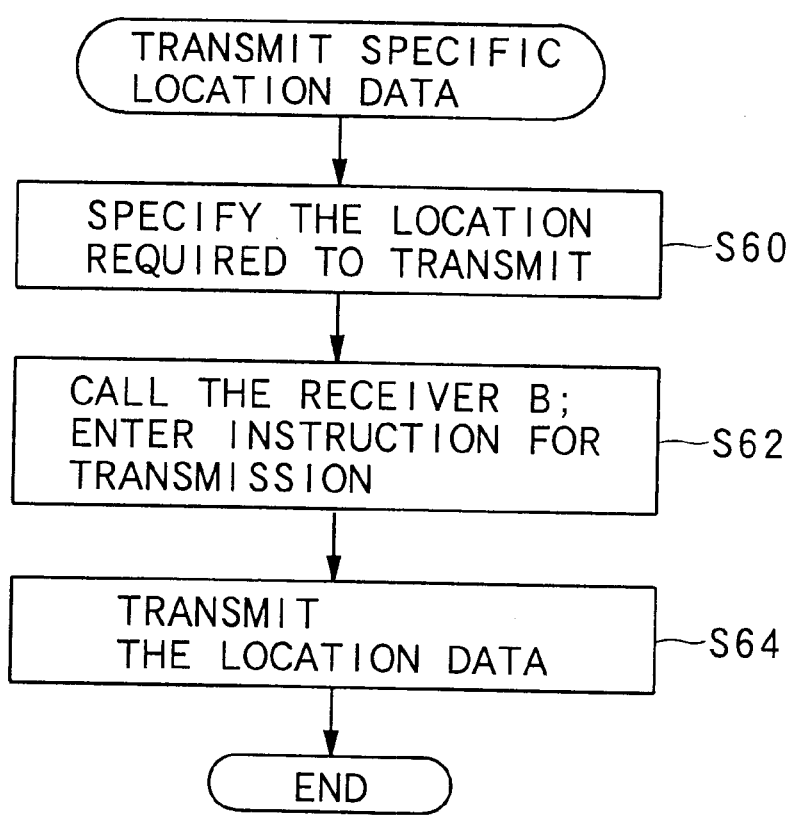
FIG. 7 is a flowchart that shows the processing when a specific location other than the current location is transmitted.

The processing for the above described cases is shown in FIG. 7. First, the transmitter A designates the place or location he wishes to send (step S60). This can be carried out in various ways. For instance, the current location data is obtained at a location, and the data is stored in the system memory 11 and the like; the location data for the specific place can be specified by accessing the location data. Also, when the information regarding stations of any transportation, prominent landmarks, etc. are included in the map data memory, the location data can be specified by accessing the area and designating the specific landmark. Furthermore, latitude and longitude data can be entered directly.

When the location data for the place the transmitter A wishes to send is specified, he calls the receiver B, and enters transmission instruction of the location data by operating his cellular phone set 1 (step S62). As a result, transmitter A's cellular phone set 1 transmits the location data to receiver B's cellular phone set 1 (step S64). The receiver B can display the received location data on the display 9 of his cellular phone set 1 in the manner shown in FIGS. 2B and 3B.

Moreover, the example shows the transmission done during a call; the location data for a specific place can be transmitted similarly using email function as described earlier.

As described above, the invention allows a user to transmit his current location to other users easily with the use of a cellular phone. In this case, the data transmitted/received among the cellular phone sets is the location data only, and large volume map data is not transmitted/received, so that the time and cost required for communication is cut down. Also, data other than the current location can be sent by specifying the location data of the location required.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-168605 filed on Jun. 6, 2000 including the specification, claims, drawings and summary is incorporated herein by reference in its entirety.

What is claimed is:

1. A portable terminal apparatus comprising:
   a positional information acquiring device for acquiring positional information;
   a transmitting device for transmitting the acquired positional information to other portable terminal apparatuses;
   a receiving device for receiving the positional information transmitted from other portable terminal apparatuses;
   a map data acquiring device for acquiring the map data in a predetermined range including the position shown by the received positional information; and
   a displaying device for displaying the map data together with a mark that indicates the position shown by the received positional information,
   wherein the transmitting device comprises an attaching device to attach the positional information to a message to be transmitted to other portable terminals and a transmission unit to transmit the positional information together with the message, and the displaying device displays the positional information together with the message.

2. The portable terminal apparatus according to claim 1, wherein the positional information acquiring device includes a GPS apparatus which obtains positional information of the portable terminal apparatus based on a wave from a satellite.

3. The portable terminal apparatus according to claim 1, wherein the positional information acquiring device includes a positional information input unit used by a user to enter the positional information.

4. The portable terminal apparatus according to claim 1, wherein
   the portable terminal apparatus is provided as a cellular phone set and
   the transmitting device comprises a transmission instruction input unit for a user to enter transmission instructions during a call and a transmission unit to transmit the positional information when the transmission instruction is entered.

5. The portable terminal apparatus according to claim 1, wherein
   the portable terminal apparatus is provided as a cellular phone set.

6. The portable terminal apparatus according to claim 1, wherein the map data acquiring device comprises a map data storing device that stores acquired map data and a map data acquiring device for acquiring map data in a predetermined range from the map data storing device based on the positional information.

7. The portable terminal apparatus according to claim 6, wherein the map data storing device is a memory removable to the portable terminal apparatus.

8. The portable terminal apparatus according to claim 1, wherein the map data acquiring device comprises a transmitting device for transmitting the positional information to a site that provides map data via the internet and an acquiring device for acquiring map data in a predetermined range from the site that provides the map information.

9. The portable terminal apparatus according to claim 1, wherein the positional information is attached to an e-mail message and is transmitted and displayed together with the e-mail message.

10. A positional information communication method for communicating positional information between a portable terminal apparatus equipped with a GPS apparatus on a transmission side and another portable terminal apparatus on a reception side, the method comprising the processes of:
    acquiring positional information that shows the current location of the portable terminal apparatus using the GPS apparatus;
    transmitting the positional information to the terminal apparatus on the reception side from the terminal apparatus on the transmission side;
    receiving the positional information in the terminal apparatus on the reception side;
    acquiring map data in a predetermined range including the location shown by the positional information;
    attaching the positional information to a message to be transmitted to other portable terminals and transmitting the positional information together with the message; and
    displaying the map data acquired together with a mark that indicates the location shown by the positional information.

* * * * *